Dec. 18, 1956     W. F. STALEY     2,774,835
CONTROL FOR OFF-THE-ROAD VEHICLES

Filed Feb. 7, 1955     2 Sheets-Sheet 1

FIG. 7A     FIG. 7B     FIG. 7C

INVENTOR
William F. Staley

BY *[signature]*

ATTORNEY

Dec. 18, 1956    W. F. STALEY    2,774,835
CONTROL FOR OFF-THE-ROAD VEHICLES
Filed Feb. 7, 1955    2 Sheets-Sheet 2
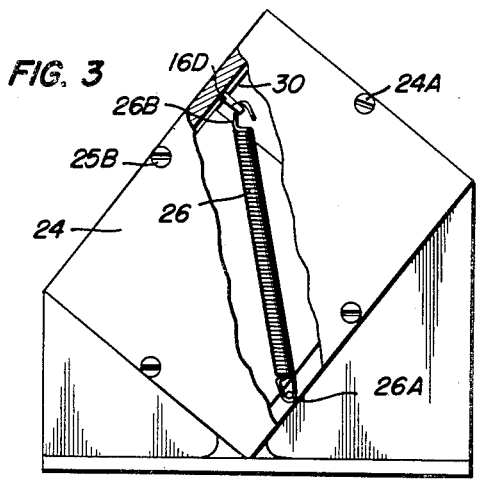
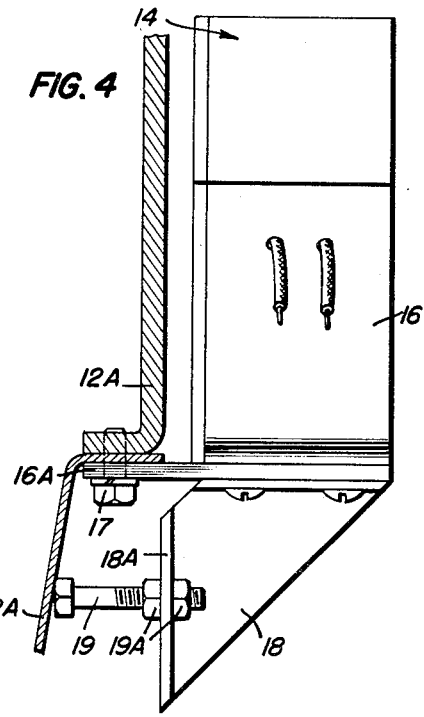
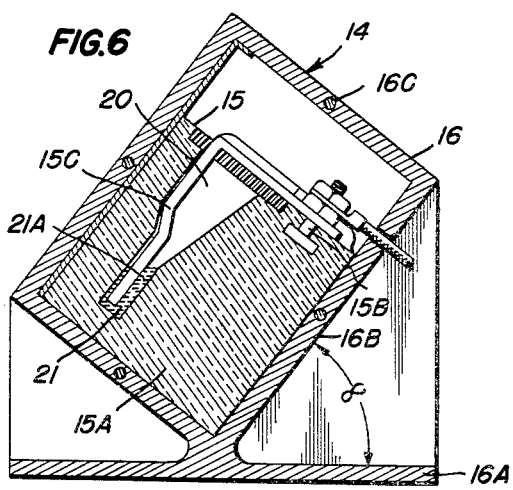
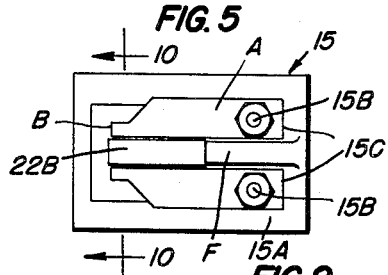
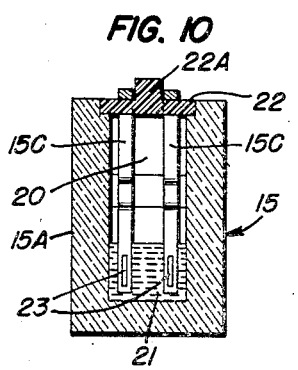
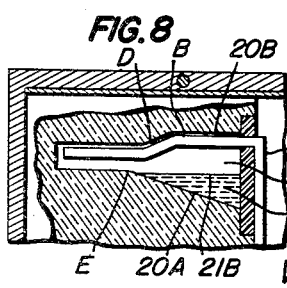
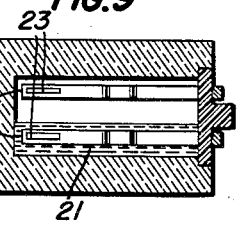
INVENTOR
William F. Staley
BY
ATTORNEY

United States Patent Office 2,774,835
Patented Dec. 18, 1956

2,774,835

CONTROL FOR OFF-THE-ROAD VEHICLES

William F. Staley, Botetourt County, Va.

Application February 7, 1955, Serial No. 486,356

6 Claims. (Cl. 200—61.47)

My invention relates generally to safety devices for self-propelled vehicles, having particular emphasis with relation to off-the-road vehicles. More particularly it concerns such safety devices when applied to and in combination with farm tractors and generally similar and related vehicles.

One object of my invention is to provide, both alone and in combination with gasoline or diesel-type farm tractors and generally allied self-propelled machines, a safety device which, small, compact, sturdy and inexpensive, ensures in certain and almost fool-proof manner, positive interruption of the ignition or other control circuit of the machine when, due to irregularities in terrain or because of other difficultly, the machine tends to revolve about the line of contact of its rear wheels with the ground as a center, the application of driving torque being interrupted before the machine revolves through a critical vertical angle; and which device at the same time serves additionally and positively to interrupt the ignition circuit of the machine should the latter overturn to either side.

A further object is to provide a safety device of the type described which is characterized by its marked absence of wear during extended service, by its long useful life, by its certainty of operation under all extremes of both atmospheric and geographic operating conditions, its effective anti-splash qualities while using a liquid conductor, and by its inherently safe and non-arcing electrical operating characteristics, fully complying with all requirements of fire underwriters.

All the foregoing, as well as many other highly practical objects and advantages, attend the practice of my invention, which will in part be obvious, and in part more fully pointed out during the course of the following discussion.

Accordingly, my invention may be considered to reside in the several parts, elements, combinations of parts and/or elements, and features of construction, and as well, in the combination and relation of each of the same, not only with one or more of the others, but as well with respect to the farm tractor or other generally similar mobile equipment, the ignition or other control system of which is controlled by my new device.

In the several views of the drawings, wherein illustratively, I have disclosed that embodiment of my invention which I prefer at present:

Figure 1:
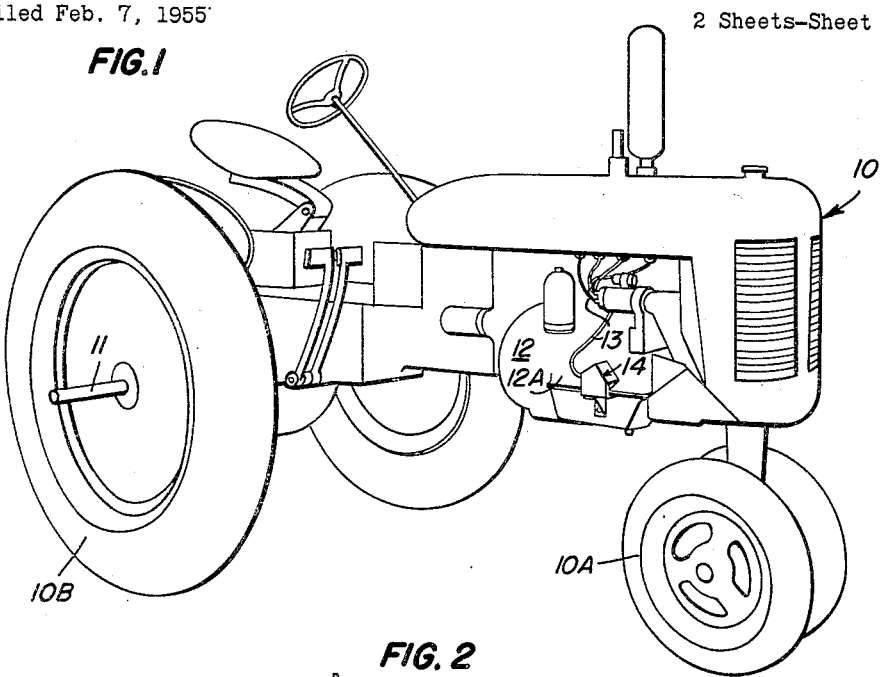
Figure 1 is a perspective view, somewhat diagrammatic, showing my device as applied to a vehicle which is typical of the class described, here a farm tractor.

Figure 3 is a view, on enlarged scale, showing my new device on its carrying frame, and disclosing the angle on which it is applied to the major axis of the machine undergoing control, it being assumed that the machine is traveling to the left in Figure 3, so that, along with the control device, it will swing clockwise in Figure 3 should the machine encounter an obstacle blocking further forward progress;

Figure 4 is an end view, looking from the driver's seat, showing the control device as assembled and as attached to the tractor;

Figure 5 is a top plan view showing the casing of my control device, with electrode element device assembled in place;

Figure 6 discloses in vertical longitudinal section, the casing position in its carrying frame, parts being broken away to disclose one electrode in operating position; this figure discloses the angle of repose of the conductive liquid, as well as the level thereof, during typical normal operation of the vehicle, considered as moving to the left in Figure 6. The casing is positioned in the frame consistent with the arrows 10—10 of Figure 5;

Figures 7a, 7b and 7c are respectively, perspective, top plan, and elevational views of one of the electrodes;

Figure 8 is a view, skeletonized, with liquid level indicated in dotted lines, of the control device when the machine to which it is applied has revolved through the preselected critical and control angle, here empirically and conveniently selected as 55°;

Figure 9 is a view, generally similar to Figure 8, showing in dotted lines the liquid level when the machine has fallen bodily on its side; while Figure 10 is a cutaway section of the casing showing alignment of the electrodes and the structure of the cap looking in the direction of arrows 10—10 in Figure 5.

Throughout the several views of the drawings, like reference characters denote like structural parts.

As conducive to a more thorough understanding of my invention it may be noted at this point of the disclosure that with farming now highly mechanized, the problems interposed in the operation of farm tractors and generally similar self-propelled vehicles, particularly those intended for and employed primarily in off-the-road work, assumed considerable importance in the practical everyday farming operation. And one serious hazard attendant upon the use of tractors is their tendency to overturn when confronted by unexpected obstacles which, with power uninterrupted by accelerator or other throttle control, they undertake to climb over. Especially is this true where the tractor is employed in hilly terrain.

These difficulties stem in large measure from the practical necessity of employing large-diameter drive wheels on the tractor. And this is required in order to overcome the minor obstacles which are encountered by the tractor during its passage over the fields in the course of its off-the-road use. For, if the tractor were to be equipped with small-diameter drivers, obstacles which are readily surmounted by the tractor equipped with large drive wheels, would completely wedge the small-diameter wheels, and block the passage of the small-drivered tractor.

But these large drive wheels themselves interpose difficulties which are characteristic thereof. For, assuming the wheels to encounter an obstacle sufficient to wedge even them, then with continuing application of driving torque, which either remains constant or increases in value, and with the drive wheels no longer able to rotate about their axle, these wheels thereupon tend to turn or revolve about their line of contact with the ground—a line which is parallel to the transverse axis of the vehicle. This action causes the front of the tractor to swing through a vertical angle about such line of contact as a center line. When this happens, then if the application of driving torque continues unabated, the tractor will shortly flip completely over, sometimes crushing the operator during overturning. And this happens with distressing frequency.

Moreover, during operation on the side of a slope, either while progressing horizontally or angling either up or down-hill, it sometimes occurs that the angle of lean of the tractor, i. e. its sidewise inclination from the vertical, will exceed its angle of repose, so that the tractor will tip over on its side. And when this occurs, the operator more often than not, will have insufficient time or else will fail to turn off the ignition switch. The motor quite likely will continue running and fuel will be pumped through the system. Or spilling from the fuel tank or elsewhere along the fuel line, such fuel will be sparked by the live ignition system. Destructive fire, well-nigh explosive in character, quite possibly will result.

Needless to say, the workers in the field have been alerted to all these possibilities. And much effort has been directed to the solution of these difficulties. For one reason or another, however, or perhaps in any particular case due to a combination of two or more such reasons, the products of those efforts have uniformly fallen somewhat short of complete success. And these problems remain without full solution thereof. For example, there does not exist, so far as I know, a control device which will discontinue motor operation upon start of swing of the tractor frame through a vertical angle, which device will also terminate motor action should the tractor frame fall to its side. Moreover, while devices have been produced which to some extent tend to disconnect the motor-energizing circuit upon tractor swing through a vertical angle, these too, have not proven entirely satisfactory. In some instances such controls have proven uncertain in action; in other cases they have been either too sluggish or unpredictable in response. Tendency to burn at contact points has been observed. No completely satisfactory solution of the problem has as yet been proposed.

Accordingly, an important object of my invention is to avoid, or at least substantially to minimize, the various defects, deficiencies and difficulties heretofore confronting the art; and at the same time to provide a tractor control which is simple, sturdy and certain in operation, of low cost both in production and operation, possessing long useful life, and which terminates ignition action both upon safe and predictable bodily swing of the tractor through a vertical angle and when the tractor swings to its side, all in the substantial absence of damage to the working parts of the control from arcing or other allied and related causes.

And now, having reference to the several views of the drawings, in Figure 1 I illustratively disclose an off-the-road vehicle, here comprising a farm tractor 10. This tractor conventionally has the usual small front guide wheels 10A, and, as well, the usual large-diameter rear drive wheels 10B. It is to be noted that while the front guide wheels 10A are of small diameter, they carry the major part of the engine load. On the other hand, while the drive wheels 10B in a typical instance have diameter several times that of the front wheels, they are disposed rearwardly on the tractor chassis or frame from the tractor motor, and therefore are loaded to a substantially lesser degree. Ordinarily the wheels 10B rotate with and on drive axle 11. Through a suitable and conventional drive mechanism, not shown, this axle is powered by a conventional internal combustion engine, typically gasoline or diesel, indicated generally and somewhat schematically at 12 in Figure 1. Engine 12 is provided with a suitable body casting or cylinder black 12A and is energized through a suitable and conventional ignition system 13, all as indicated generally in Figure 1.

Figure 2:
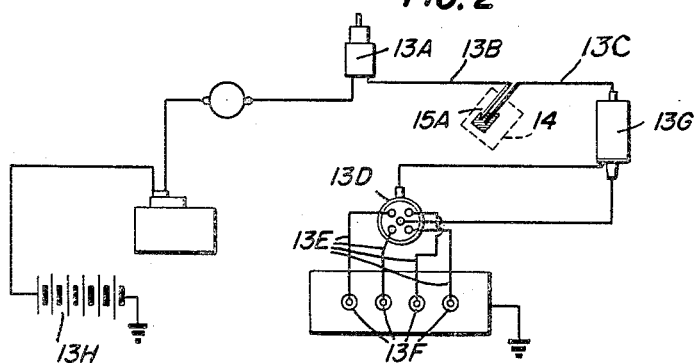
Figure 2 is a wiring diagram showing the application of my new control device therein.
Figure 2:
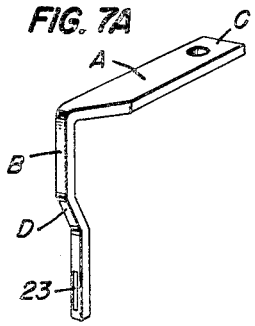
Figure 2:
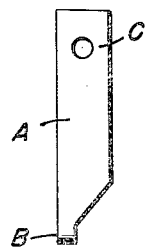
Figure 2:
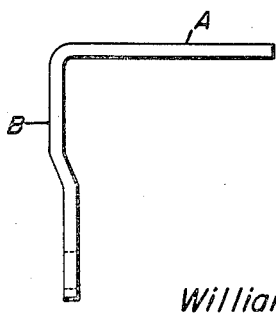

Electrical system 13, ordinarily embodying a grounded return, and as shown in Figure 2, typically includes a control or starting switch 13A, lead 13B from control switch 13A to my new control device 14, lead 13C to distributor 13D, and leads 13E from distributor 13D to spark plugs or hot spots 13F, as the case may be.

As is evident from Figure 1, my new control device 14 is mounted on the side of block 12A of engine 12.

Electrically, and as shown in Figure 2, it is interposed in the ignition circuit 13 between the starting switch 13A and the distributor 13D. A conventional source of electrical energy, typically a battery or magneto, 13H, is provided to complete the circuit. And a high voltage coil 13G is conventionally included.

In Figure 4 I show in somewhat greater detail, the manner in which I apply my new control device 14 to the cylinder block 12A or other suitable part of the engine, such as the cylinder head. Upon reference to Figure 6 it will be seen that conveniently, the working part 15 of my control device 14 is carried in a frame 16. While this frame 16 may comprise two or more parts, I prefer to construct it as a single casting or stamping. This frame comprises a footing 16A which is bolted or otherwise secured in convenient manner to cylinder block 12A at the side of the motor. While this frame may have any desired suitable configuration, here it is shaped as a short length of U-section channel-iron, the major length of which extends longitudinally along the major axis of the engine, with its web portion seated up against the engine block 12A. A second part 16B of the integral frame 16 comprises a hollow rectangular element, open at its ends, and set within the channel legs of frame portion 16A, at a selected angle α to the longitudinal extent of the frame portion 16A.

Now, the selection of the angle α is largely empirical, and is highly important from the standpoint of proper control action on the part of my new control device. This angle α has to do with the moment of cut-out of the engine ignition circuit 13 or other fuel control. Now, the operation of my new control is such that the ignition circuit 13 is interrupted when the tractor swings through a pre-determined vertical angle, while revolving about the line of contact of its rear wheels 10B with the ground. Should the angle α be too great, then inertia momentum will momentarily continue the tipping action of the tractor, even after the ignition system has been deenergized; and the control action will prove so sluggish that the tractor will not be effectively restrained. It will overturn. On the other hand, should the angle of cut-out thus empirically selected prove too small, control action will be overly sensitive. And the operator will be continually harassed by frequent and unexpected power stoppages. My investigations have led me to the selection of an angle of 55° as the optimum value of this angle α. And while of course it may have any other selected value within the scope of my invention, I find that when 55° is selected as the angle of cut-out, highly satisfactory performance is observed. In this instance the motor continues operation over all safe terrain, and becomes de-energized only when tendency to overturn reaches serious proportions. Almost perfect safety is thereby insured so far as concerns the tractor flipping end over end.

As best shown in Figure 4, I secure the frame 16 to the cylinder block 12 in any desired and suitable manner, illustratively by bolts, cap screw or the like, 17. Conveniently, these may be the oil-pan bolts. And as will be seen from this figure, the weight of the assembled device 14 being cantilevered off the holding elements 17, it is desirable to provide an adjustable spacer from the frame or similar structural part of the tractor or the like, for resisting the moment of force exerted by the device 14 about the bolts 17. Together, they provide a force couple. And to that end I provide a bracket 18 of triangular or other suitable configuration, and conveniently of sheet metal, between the engine block or motor frame 12A on the one hand and the bottom part 16A of frame 16 on the other hand. This bracket, as shown in Figure 4, has a vertical leg portion 18A. And between this vertical leg portion and the engine block 12A, I provide a bolt or the like 19, with threaded nuts 19A, 19A, provided one on each side of the vertical portion 18A of the bracket 18. By backing off one said nut while threading down the other nut, close adjustment can be achieved of the position of the device 14 relative to the cylinder block or the like 12A.

Again referring to the construction according to Figure 6: when the tractor together with the control 14 swings rearwardly through a vertical angle of 55° about the length of the tractor—(clockwise in Figure 6)—then control device 14 assumes the horizontal position shown at the upper right in Figure 8, and asserts its control action, to be described.

In Figures 5 through 8 I disclose certain details of the active part 15 of the control 14. And this active part 15 comprises a casing 15A, generally rectangular in exterior configuration in the embodiment shown, and fitting nicely in part 16B of frame 16. Conveniently, it is molded, blown, cast or otherwise formed of glass, infrangible ceramics, plastic or other suitable and conventional material, possessing high di-electric qualities. If constructed of glass or plastic, I prefer that this be transparent, or at least translucent. Binding posts 15B, as by molding, casting, or the like, are let into the top surface of the casing 15A, preferably near the rear edge thereof.

Forwardly of the binding posts, and disposed centrally between them, I provided an elongated well 20. This extends through casing 15A to an extent reaching just short of the bottom thereof. This well 20 serves to receive paired complemental electrodes 15C, 15C, which cooperate, one with each binding post 15B. As may be seen from a consideration of Figures 6 and 8, the well 20 is generally pistol-like in configuration, with the leading or barrel end at the left and the trailing or butt end at the right. In the bottom of the well 20 I provide a small quantity of mercury 21 (Figure 6) sufficient in amount to cover the ends of the electrodes 15C, 15C and to establish good electrical contact therebetween when the casing 15A is in its Figure 6 position. The quantity of mercury is so selected, however, that it is insufficient to cover the electrodes, and therefore breaks the circuit therebetween when the active part 15 assumes the Figure 8 position. This quantity of mercury is also determined empirically. And the proper amount thereof may be quickly determined by experiment during construction, in each individual case.

Preferably I form electrodes 15C, 15C of wrought iron, striking them from sheet metal. I select this metal because of its low cost. And I make provision against possible attack by the mercury filling in a manner hereinafter more fully pointed out.

It is to be noted that the well 20 is rectangular in cross-section. I choose this construction—or at least one which is discontinuous and preferably but not necessarily symmetrical in cross-section throughout the length of the well—in order to guard effectively against undue turbulence of the liquid conductor such as mercury or the like which I provide at the bottom of the well. Consideration will show that if this well were continuous in cross-section, and particularly if circular in section, tendency would exist for the mercury or other liquid conductor to start bodily into motion as a result of movement of the off-the-road vehicle on which is mounted, the control device of which it comprises part. And with continuous cross-section, i. e. uninterrupted by any breaks in continuity, the mercury would tend to swirl. And since there are no interruptions in continuity, this tendency towards swirling would continuously build up in amplitude until the mercury would splash upwardly and outwardly from the bottom of the well. This would tend towards intermittent, unpredictable and unwanted uncovering of the electrodes. Faulty operation would be observed. The motor circuit would be interrupted. And the motor would have to be re-started through the starter switch, if circuit interruption endured sufficiently long for the motor to die out. And this faulty action would be observed both on side-hill and up-hill movement of the vehicle. By providing a discontinuous cross-section, with dimensions sufficiently small in the region of repose of the mercury, I ensure that incipient motion of the mercury is broken up before it reaches dangerous amplitude. And swirling is effectively avoided. Wave action is suppressed, and the mercury is cause to "beat" on itself and to dampen out any attempted wave action.

It is to be noted that while the well is rectangular in cross-section, it varies in longitudinal dimension. And in longitudinal section it has somewhat the shape of a truncated triangle—a sort of flask-like configuration, with a tapered upper portion flaring outwardly towards the top or outlet and, and progressively reducing in cross-section down to a point about half an inch above the bottom of the well. It may be referred to as having generally "pistol-like" configuration, with the barrel aimed downwardly, and with the butt portion top-most. As can be seen from a consideration of the Figure 8 position, it is the wall 20A of the well 20, bottom-most in the Figure 8 position, which is tapered. The top wall 20B is straight or nearly so, with respect to the longitudinal axis of the well 20. The taper is imparted to wall 20A so that when the well 20 assumes its Figure 8 position, space will be provided, defined by wall 20A, into which the mercury can flow, out of contact with electrodes 15C, 15C. For convenience, the mercury level of the working position—as shown in Figure 6—is indicated at 21A. While at 21B I indicate the mercury level in the disconnect position—Figure 8.

Consideration of Figures 5 and 10 discloses that electrodes 15C, 15C are complementary to each other in conformation, and are struck from inexpensive metal, of comparatively heavy gauge. And as better shown in Figures 7A, 7B and 7C, each electrode is substantially L-shaped, having a top, shank portion A which is comparatively wide, thereby providing adequate bearing surface on top of the casing 15A. I provide thereon a vertically-extending and downwardly struck leg portion B of reduced width. The shank portion A has near its free end, an eyelet C, suitably formed as by punching or drilling, for receiving the corresponding binding post 15, over which it is fitted.

It is to be noted that leg portion B of each electrode 15C is diagonally stepped or offset at D, and that a corresponding offset is formed at E in wall 20A in well 20. The purpose of this offset E is to ensure that mercury 21 will fall clear of the electrodes 15C, 15C in the Figure 8 position of the casing 15A. This ensures that whenever the tractor, encountering an obstruction, begins to swing its front end any appreciable distance from the ground, thereupon the ignition system of the tractor will be interrupted, and the tractor will thereafter fall forwardly and the front end thereof will fall back to the ground.

It is essential, of course, that at all times the electrodes 15C, 15C be physically separate from each other. And while this requirement may be satisfied in a number of manners, perhaps the simplest is to provide a ridge F molded or otherwise struck upwardly from the top surface of casing 15A (Figures 5 and 10), and extending longitudinally from the rear or right edge (Figure 6) of the casing 15A to the near edge of well 20. Ridge F, possessing di-electric qualities, serves as a separator for the electrodes 15C, 15C; while the respective longitudinal side walls of this ridge serve as abutment guides for these electrodes. And these guides cooperate with the well itself to align the electrodes automatically in proper working position.

Once the electrodes 15C, 15C are properly positioned, clamped in place on binding posts 15B, 15B, and mercury 21 is introduced into the well, it is necessary to seal the mercury in the well 20. And for this purpose I provide a cap 22 formed of plastic or other suitable material, preferably light in weight, impervious to attack by mercury, and which can be effectively sealed about the electrodes and over the top of the well 20. Preferably the cap has a longitudinally extending and upwardly depending ridge portion 22A. This is struck upwardly and away from the under surface of the cap 22 when the latter is in its operable position. This operable position of cap 22 is over the top of the well, but under the horizontal leg portions of the electrodes, with the ridge 22A extending upwardly from the top surface of cap 22 and between the electrodes. And this ridge 22A has an outward projection or overhang 22B at that end of the cap which is foremost in assembly (to the left in Figure 5). This ensures complete closure at the front vertical wall of the well where the electrodes extend downwardly thereinto. This ridge has approximately the same cross-sectional dimension as the ridge F of the casing 15A, and serves as an additional guide and separator for the electrodes. This cap 22 is sealed in position, using for that purpose any desired and conventional sealing medium not subject to attack by mercury such as sealing wax or the like; and thereby effectively retains the mercury in the well during use of the control device 14.

To ensure proper operation of electrodes 15C, 15C I provide them with contact inserts 23, 23 in the region projecting into the mercury during normal position of the tractor. And these inserts may be formed of platinum or other suitable material, having good qualities of electrical conduction and being substantially impervious to attack by mercury, forming an amalgam therewith only with difficulty, if at all.

A suitable means such as cover plate 24 (Figure 3) is provided to close the open face of the frame 16, should this be desired. And this plate 24 serves effectively to retain firmly in position the working part 15 of the control device 14 during the use of the latter. And this is so even during tilt of the tractor, either sideways, about a longitudinally-extending axis, or upon end-over-end flip-over about a transversely-extending axis (having reference to the tractor itself). The plate 24 may be retained in position against the frame 16 in any desired suitable manner, as by screws or the like 24A let into eyelets 25B registering, in assembly, with corresponding threaded bores 16C in the edge of the frame 16. Alternatively, if desired, a coiled spring 26 is anchored as at 26A in the edge of the frame 16 (Figure 3), while the other end 26B of the spring engages a hook 16D formed in angle bracket 30 which overlies one corner of casing 15 (Figure 3).

And now, with the foregoing general description as a background, it is in order to consider the precise mode of operation of my new device. Assume that the tractor is proceeding across ground where the angle of tilt of the tractor, through a vertical swing about the transverse axis represented by the axle of the drive wheels, is less than 55°, and the side tilt, either to the left or to the right, is less than the angle of repose of the machine. In such case the tractor, regardless of the type of load, will proceed in ordinary manner steered by the small diameter front wheels 10A, 10A and driven by the large diameter rear or drive wheels 10B, 10B, the latter rotating about the axle 11.

In such instance the control device 14 assumes its working position shown in Figure 6. And the mercury 21 is in the bottom of the flask or well 20, in intimate contact with the electrodes 15C, 15C. In this situation, and considering the diagram of Figure 2, a working circuit is closed through the starter switch 13A, lead 13B, one binding post 15B of working part 15 of control device 14, through one electrode 15C, the second binding post 15B, lead 13C to distributor 13D, and thence through the leads 13E to the spark plugs 13F or the like. A high tension coil 13G and a source of electric supply 13H, conventional in such circuits, are shown in Figure 2. With circuits thus established, the power is continuously applied, and the tractor will operate in normal manner. And in so doing, the steering wheels 10A will ride over small obstructions, while the large diameter power wheels 10B, 10B will have no difficulty in surmounting such obstacles.

Assume now, however, that a large obstacle is encountered. Or similarly, and as is more likely to be the case, an obstruction is encountered by one of the working tools, dragged or otherwise maneuvered by the tractor. When such load is encountered, perhaps too great for the tractor to overcome, then rotation of the drive wheels about the axle 11 is terminated. This, because of the block encountered. The effect is as though the entire tractor is locked as a unit. And with continued application of torque through the axle 11 with the unit, thus represented, tends to revolve about the transverse line of contact of the drive wheels 10B, 10B with the ground. And if the vertical angle through which the tractor swings with respect to the horizontal approaches approximately 55°, there is every likelihood that the tractor will overturn, with attendant hazard of crushing the driver. With my device, however, when the tractor reaches this critical angle of 55°, the control device 14 assumes the Figure 8 position, with the flask or well 20 disposed nearly horizontally. And in this case, the mercury in the flask falls into the enlarged portion 20A, defined by the bottom wall of the well 20. Thus it falls away from, and out of contact with, the electrodes 15C, 15C. The electrical circuit is thus broken in positive manner. Power is interrupted. And since power is no longer applied to the drive axle, gravity takes over and the tractor tends to fall back into its rest position, with its front wheels on the ground. And when this happens, the motor drive circuit is again completed through the electrodes 15C, 15C. Since the engine has been deenergized, however, it more than likely will be necessary to start the engine anew, using the starter switch for that purpose.

The mercury serves well to quench any arc which might tend to become established across the electrodes 15C, 15C when the load thereacross is interrupted under power conditions. And if a non-oxidizing or inert gas filter is inserted in well 20 before this is sealed, this will contribute to the non-arcing characteristics of the control.

And the platinum or platinoid insets 23, 23 in the electrodes 15C, 15C prevent any appreciable electrode damage during such current interruptions.

The device has long useful life. And whenever inspection is required it is a matter of but a few moments to back off the lockdown screws or similar holding means 24A, and remove the face plate 24.

The foregoing discussion of operation has been directed largely to the situation where the tractor tends to swing through a vertical angle about the drive axle. That is, about an axle which is transverse to the longitudinal axis of the tractor.

A highly important function of my new device, however, is to interrupt the motor circuit when the tractor, striking terrain which has too great a tilt down slope, falls over on its side. For in this case, just as has been pointed out in an earlier point herein, the motor will serve as a dangerous focal point for sparking any fuel escaping through the tank, a broken fuel line, the carburetor, or for other reasons. It is important, therefore, that the motor circuit be interrupted when such situation occurs.

For while this general hazard exists to a certain extent even in the case of an over-the-road vehicle, it assumes much greater importance in the case of the typical off-the-road vehicle such as a farm tractor. For while with the automobile the wheels are small and weight is well distributed, and the driver is well-housed within the vehicle, so that there is little likelihood of the vehicle collapsing onto the operator or passengers, the situation is quite different with the tractor. For here the driver is in an exposed position, outside the geometry of the vehicle, which itself is comparatively poorly balanced and has grave tendency, with its large-diameter, heavy drive wheels, to collapse and crush the driver when the vehicle turns on its side. Practically, therefore, interruption of motor circuit at critical point in sidewise motion of the vehicle is quite important. And it is apparent from consideration of the several views of the drawings that when sidewise collapse takes place, the mercury will fall away away from the top-most one of the two electrodes 15C, 15C, into the space provided therefor in the flask or well 20, and will interrupt the motor circuit with absolute certainty (Figure 9). With the motor action interrupted, there will no longer be appreciable danger of sparking any escaping fuel, while rotation of the drive wheels will be discontinued.

The result is that the tractor is rendered nearly as foolproof in operation as is possible. And the two principal sources of hazard normally encountered in operation are effectively suppressed. And this is done in simple, ready, and efficacious manner. Cost, both of initial production, installation, and subsequent maintenance in operation, is kept within low limits.

The driver is relieved from the duty of guarding constantly against the hazards heretofore attending tractor use. And thus, he is able to give his entire attention to his operation of the tractor and to the agricultural or other use to which it is put. Superior results and more rapid husbandry are thus insured.

All the foregoing, as well as many other highly practical advantages, attend the practice of my invention.

It is apparent from the foregoing that once the broad aspects of my invention are disclosed, many embodiments thereof will readily suggest themselves to those skilled in the art, and as well, many modifications of the embodiment here disclosed, all falling squarely within the scope of my invention. Accordingly, I intend the foregoing disclosure to be considered as purely illustrative, and not by way of limitation.

I claim:

1. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess, said well being flared intermediate its said leading end and said butt portion of said recess; paired and spaced, generally L-shaped electrodes provided in said body portion and adapted for connection in the ignition circuit of the related vehicle, and extending in spaced relation both to each other and to said body portion, into said recess to a point just short of the bottom thereof; and a body of mercury in the bottom of said well, of depth sufficient to cover the contact ends of the spaced electrodes when the associated vehicle is in repose, the flare of the intermediate extent of said well portion being such that when said control, which is fast to the vehicle, is rocked bodily through a sufficient angular extent, the mercury thereupon flows out of the bottom of the well into the flared portion, thereby breaking contact between the paired electrodes.

2. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess; the construction defining said well being such that when the vehicle is tilted through a vertical angle, the well is comprised of a bottom wall which in itself is comprised of two angularly-related portions, the leading one of which portions, adjacent the leading or bottom end of the well comprising, along with the spaced opposite wall of said well, a region of substantial and uniform cross-section along its length, while the trailing or inner portion of said bottom wall, in the intermediae extent of said well comprising, along the opposite wall of said well, a region of continuously increasing cross-section towards the trailing end of said well; paired and spaced, generally L-shaped electrodes provided in said body portion and adapted for connection in the ignition circuit of the related vehicle, and extending in spaced relation both to each other and to said body portion, into said recess to a point just short of the bottom thereof; and a body of mercury in the bottom of said well, of depth sufficient to cover the contact ends of the spaced electrodes when the associated vehicle is in repose, the flare of the intermediate extent of said well portion being such that when said control, which is fast to the vehicle, is rocked bodily through a sufficient angular extent, the mercury thereupon flows out of the bottom of the well into the region of continuously increasing cross-section, thereby breaking contact between the paired electrodes.

3. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess, said well being flared intermediate its said leading end and said butt portion of said recess; paired and spaced, generally L-shaped electrodes provided in said body portion and adapted for connection in the ignition circuit of the related vehicle, and extending in spaced relation both to each other and to said body portion, into said recess to a point just short of the bottom thereof; and a body of mercury in the bottom of said well, of depth sufficient to cover the contact ends of the spaced electrodes when the associated vehicle is in repose, the flare of the intermediate extent of said well portion being such that when said control, which is fast to the vehicle, is rocked bodily through a sufficient angular extent, the mercury thereupon flows out of the bottom of the well into the flared portion, thereby breaking contact between the paired electrodes, said well being generally rectangular in cross-section throughout its length, its discontinuous wall surface tending effectively to suppress swirl or wave action in the mercury.

4. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess; the construction defining said well being such that when the vehicle is tilted through a vertical angle, the well is comprised of a bottom wall which in itself is comprised of two angularly-related portions, the leading one of which portions, adjacent the leading or bottom end of the well comprising, along with the spaced opposite wall of said well, a region of substantial and uniform cross-section along its length, while the trailing or inner portion of said bottom wall, in the intermediate extent of said well comprising, along with the opposite wall of said well, a region of continuously increasing cross-section towards the trailing end of said well; paired and spaced, generally L-shaped electrodes provided in said body portion and adapted for connection in the ignition circuit of the related vehicle, and extending in spaced relation both to each other and to said body portion, into said recess to a point just short of the bottom thereof; and a body of mercury in the bottom of said well, of depth sufficient to cover the contact ends of the spaced electrodes when the associated vehicle is in repose, the flare of the intermediate extent of said well portion being such that when said control, which is fast to the vehicle, is rocked bodily through a sufficient angular extent, the mercury thereupon flows out of the bottom of the well into the region of continuously increasing cross-section, thereby breaking contact between the paired electrodes, the well having cross-sectional dimensions throughout its length sufficient to permit ready flow of the mercury, and the walls defining said well being themselves smooth and free from surface protruberances, contributing to ready, certain and rapid flow of the mercury thereacross.

5. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess, said well being flared intermediate its said leading end and said butt portion of said recess; paired and spaced, generally L-shaped electrodes provided in said body portion and adapted for connection in the ignition circuit of the related vehicle, and extending in spaced relation both to each other and to said body portion, into said recess to a point just short of the bottom thereof; said body portion comprising an open block and a separate and complemental top therefor, both said block and said top being formed of electrically insulating material; and means for removably and pressure-securing said top to said block; and a body of mercury in the bottom of said well, of depth sufficient to cover the contact ends of the spaced electrodes when the associated vehicle is in repose, the flare of the intermediate extent of said well portion being such that when said control, which is fast to the vehicle, is rocked bodily through a sufficient angular extent, the mercury thereupon flows out of the bottom of the well into the flared portion, thereby breaking contact between the paired electrodes.

6. In combination with a self-propelled vehicle having an ignition circuit, a control for said ignition circuit, which control comprises an elongated body portion removably fast to said vehicle, said body portion having therein a single, generally pistol-shaped recess extending substantially the full length of said body portion, the barrel portion of said recess comprising a well which is closed at its leading or bottom end, remote from the broadened, trailing or butt end of said recess, said well being flared intermediate its said leading end and said butt portion of said recess; paired and spaced, generally L-shaped electrodes provided in said body portion and adapted for connection in the ignition circuit of the related vehicle, and extending in spaced relation both to each other and to said body portion, into said recess to a point just short of the bottom thereof; said body comprising an open block; a separate and complemental top therefor, both said block and said top being formed of electrically insulating material; means removably and pressure-securing said top to said block, said top, on its inner surface, having an upstruck insulating spacer extending between the paired and spaced electrodes; and a body of mercury in the bottom of said well, of depth sufficient to cover the contact ends of the spaced electrodes when the associated vehicle is in repose; the flare of the intermediate extent of said well portion being such that when said control, which is fast to the vehicle, is rocked bodily through a sufficient angular extent, the mercury thereupon flows out of the bottom of the well into the flared portion, thereby breaking contact between the paired electrodes.

References Cited in the file of this patent

UNITED STATES PATENTS

| | | |
|---|---|---|
| 2,067,057 | Lawson | Jan. 5, 1937 |
| 2,192,262 | Griesedieck | Mar. 5, 1940 |
| 2,192,797 | Muter | Mar. 5, 1940 |
| 2,535,207 | Hook et al. | Dec. 26, 1950 |
| 2,541,571 | Clapp | Feb. 13, 1951 |
| 2,708,226 | Dixon | May 10, 1955 |